United States Patent Office 3,634,256
Patented Jan. 11, 1972

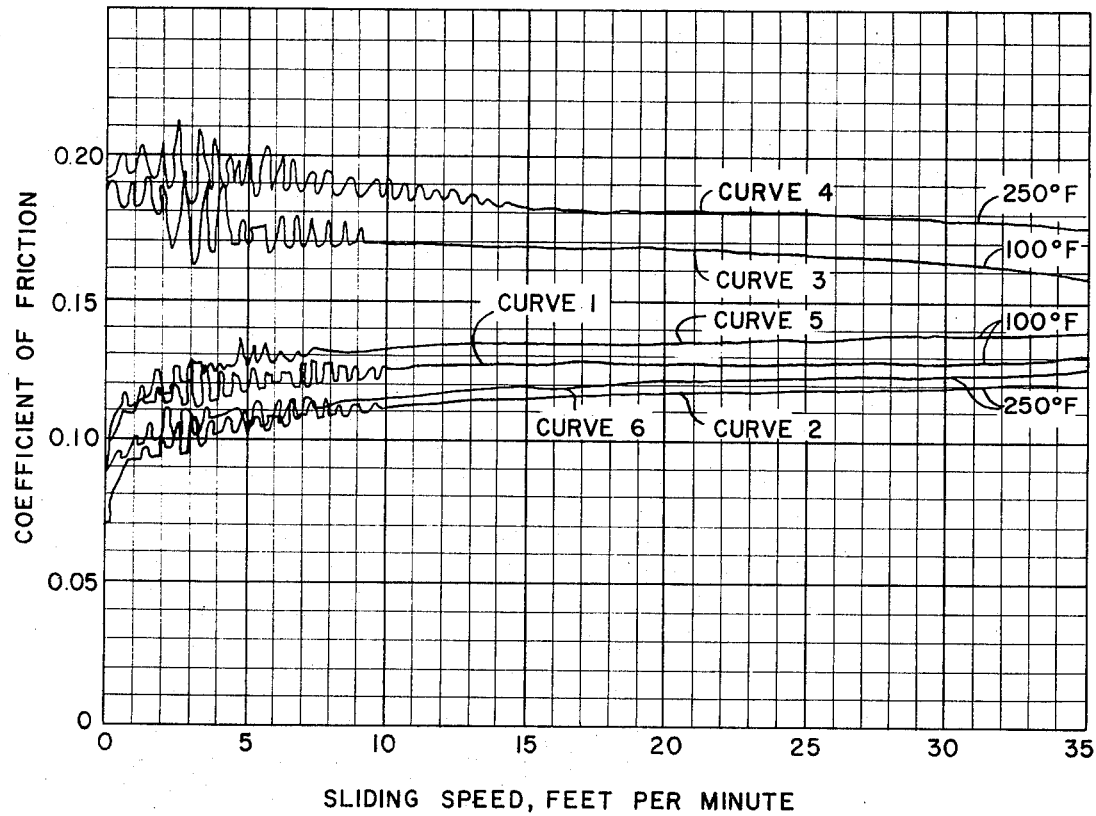

3,634,256
TRANSMISSION FLUID COMPOSITIONS
Kenneth L. Bickham, East Alton, Ill., assignor to
Shell Oil Company, New York, N.Y.
Filed May 16, 1969, Ser. No. 825,372
Int. Cl. C09k 3/02; C10m 1/32, 3/26
U.S. Cl. 252—75
8 Claims

ABSTRACT OF THE DISCLOSURE

Transmission fluid compositions containing an oxyalkylated tertiary amine and a substituted imidazoline and a polyalkenyl substituted succinimide dispersant have excellent fluid friction characteristics and oxidation stability. Through the interaction of the oxyalkylated tertiary amine and the substituted imidazoline, not only is it possible to change the shape of the friction curve, but it is also possible to attain the most desirable levels of static and kinetic friction.

This invention relates to unique lubricant compositions which are useful as power transmitting fluids. More particularly, this invention relates to transmission fluids possessing excellent fluid friction characteristics and oxidation stability in addition to other properties such as clutch durability, elastomer compatibility, viscosity stability, metals compatibility, antiwear, antifoam and low temperature properties.

For a number of years, automobile manufacturers have expressed a desire for high performance level, "fill-for-life" factory-fill automatic transmission fluids. This desire, coupled with more recent problems arising in the field due to higher transmission operating temperatures resulting from the use of increased horsepower engines and lower rear axle ratios, has created a demand for automatic transmission fluids possessing superior performance qualities.

Indicative of the industry's demand for high performance transmission fluids is General Motors' recent automatic transmission fluid specification, Dexron® Automatic Transmission Fluid, GM 6032-M, published in August 1967. The requirements of this specification are very stringent. Considerable emphasis is placed on the frictional characteristics and oxidation stability in addition to the many other properties requisite for products of this type.

In order to have trouble-free transmission operation, it is necessary that the friction characteristics of a transmission fluid do not adversely change during extended periods of use. Any such deterioration can result in what is referred to as an "abrupt lock-up" or an "extended lock-up," both of which conditions are extremely serious. An abrupt lock-up is of concern because it can hasten mechanical failure in the drive train, while extended lock-up results in excessive heat build-up which can damage the clutch facing material and eventually cause transmission failure.

Theoretically, transmission fluids which give the best performance in respect to smooth noise-free clutch performance are those having an increasing coefficient of friction with increasing sliding speed. Unfortunately, most mineral oil based transmission fluids containing the various additives necessary to meet oxidation stability and other requirements, have decreasing coefficients of friction with increasing sliding speed and therefore do not possess the desired frictional characteristics.

A further consideration in relation to friction characteristics is the effect of temperature on the coefficient of friction. Transmissions are operated over a relatively wide range of temperatures; therefore, it is necessary that high performance transmission fluids have not only the proper relationship between the coefficient of friction and the sliding speed, but that this relationship be maintained over the range of temperatures at which transmission are normally operated.

It is apparent from the foregoing that lubricating compositions of unique properties are required to satisfy all of these diverse requirements. Advanced transmission fluids of this type are the subject of the present invention.

It has now been found that improved lubricating compositions eminently suitable as power transmission fluids can be prepared by incorporating into a lubricating oil medium, minor amounts of (1) a friction modifier selected from the group consisting of oxyalkylated aliphatic tertiary amines, 1-hydroxyalkyl-2-alkyl imidazolines and mixtures thereof, and (2) an oil soluble polyalkenyl-substituted succinimide of an alkylene polyamine.

The fluid compositions of the invention have been found to possess exceptional frictional properties and oxidation stability in addition to other qualities requisite of high performance transmission fluids. The highly beneficial results derived from the inventive additive combination were unexpected since it is generally thought that transmission fluids must have relatively high ash contents in order to have good friction characteristics. In contrast, the compositions of the invention have low ash contents, e.g. sulfated ash contents of 1% w. or less. Moreover, it was unexpected that oxyalkylated amines or imidazolines which are known to the art as emulsifying and anti-corrosion agents, respectively, would have the surprising effect of reversing the relationship between the coefficient of friction and sliding speed and substantially improving the overall frictional characteristics of transmission fluid compositions. Many compounds similar to the friction modifiers of the invention such as Armid O (high molecular weight fatty amide), Ethomid C/15 (N,N'-substituted fatty acid amide), Armeen DM-18D (dimethyl stearylamine), methyl oleate, sorbitan monooleate and Ambidex (mixture of an amide and an amine salt) were found to have little or no beneficial action on the frictional characteristics of base fluids. Other compounds such as zinc oleate, Oronite 340D (imidazoline and amide reaction product of tetraethylenepentamine and isostearic acid) and Talamid (imidazoline reaction product of tall oil fatty acids and polyamines) were found to give unsatisfactory coefficient of friction relationships with sliding speed and temperature.

The oxyalkylated amine friction modifiers which can be employed in the compositions of the invention are aliphatic tertiary amines having two oxyalkylene groups attached to the nitrogen atom. The aliphatic group of the tertiary amine can have from 8 to 22 carbon atoms, and may be derived from a variety of fatty sources such as palm oil, coconut oil, soya bean oil, tall oil, cottonseed oil, tallow, etc. Examples of suitable oxyalkylated amines are tertiary amines which have been reacted with up to 5 moles of $C_2$ to $C_4$ alkylene oxide. Oxyalkylated amines are commercially available as Ethomeens® from Armour. A particularly advantageous oxyalkylated amine is bis-2- hydroxyethyl aliphatic amine wherein the aliphatic group has from 12 to 18 carbon atoms and is derived from soya bean oil. This product is sold commercially as "Ethomeen S-12."

The substituted imidazolines which can be employed as friction modifiers in the compositions of the invention are 1,2-substituted imidazolines, particularly those in which the 1-substituent is a polar group having from 2 to 6 carbon atoms and the 2-substituent is an alkoxyl group having from 8 to 20 carbon atoms. Very suitable compounds of this type are those in which the 1-substituent is a hydroxyethyl group. A particularly advantageous imidazoline for the purposes of the invention is 1-hydroxyethyl-2-heptadecyl-2-imidazoline, which is commercially available under the trade name "Nalcamine G-13."

The oxyalkylated amine and substituted imidazoline friction modifiers may be used either singularly or in combination in transmission oils. It has been found that by using a combination of friction modifiers, compositions with very favorable static and kinetic friction properties can be obtained. It is therefore advantageous to employ a combination of the aforementioned friction modifiers.

Suitable dispersants for use in the present compositions include various nitrogen containing derivatives of polyolefins. A preferred class of such dispersants are polyolefinic substituted succinic acids and anhydrides which have been reacted with amines. A particularly advantageous group of compounds of this type are the alkylene polyamine derivatives of poly $C_{2-6}$ alkenyl substituted succinic acids or anhydrides, particularly those in which the polyalkenyl substituent is a polyisobutenyl group having a molecular weight of 500 to 5000 and the alkylene polyamine is an ethylene amine. Suitable ethylene amines include ethylene diamine, diethylene triamine, triethylene tetramine, pentaethylene hexamine, and particularly tetraethylene pentamine and mixtures of polyalkylene polyamines having compositions corresponding to tetraethylene pentamine.

These polymeric dispersants can be formed by means well known to the art, for example, as described in U.S. Pat. No. 3,202,678, issued Aug. 24, 1965 to Stuart et al., and their effectiveness generally is not dependent on their method of preparation.

The friction modifier-dispersant combination of the invention can be employed in synthetic oils, including synthetic hydrocarbons, but preferably are used in mineral lubricating oils. These mineral oils can be obtained from paraffinic, naphthenic, or mixed base crudes. Mineral oils suitable as base oils for transmission fluids are well known in the art.

The friction modifier(s) are normally employed in concentrations of from 0.01 to 4% by total composition weight, while the nitrogen containing dispersant can be used in amounts of 1 to 15% by total composition weight. More preferably, the concentration of the friction modifier(s) is from 0.05 to 2% by weight, while the dispersant is present in amounts of from 2 to 10% by weight. When a combination of friction modifiers are used, the weight ratio of the substituted imidazoline to the oxyalkylated amine should be from 5:1 to 1:5, more preferably from 2:1 to 1:4.

In addition to the friction modifier and dispersant additive combination of the invention, other additives can also be incorporated into the present compositions to impart other desirable characteristics. For example, it is preferred to include a minor oxidation-inhibiting amount of a zinc dithiophosphate compound such as zinc dialkyldithiophosphate. This additive is normally added in relatively low concentrations, e.g., 0.1% to 2% by composition weight. Other additives known to the art to perform a specific function or functions can be employed as well. Examples of these are viscosity index improvers and pour point depressants such as acrylate and methacrylate polymers and copolymers; anti-foaming agents such as silicone fluids; load carrying agents, additional antioxidants, dyes, etc.

The invention will be further described by the following examples which demonstrate the effectiveness of the inventive compositions containing the friction modifier-dispersant combination. It should be understood, however, that these examples are given for illustrative purposes only and that the invention in its broader aspects is not limited thereto.

EXAMPLE I

In order to demonstrate the surprising friction modifying characteristics of the additive combination of the invention, a series of compositions were prepared and tested in a modified Four-Ball Wear Tester. This tester is similar in principle to the Boerlage apparatus described in the magazine "Engineering," volume 136, July 13, 1933, and operates with a steel ball acting on a clutch material (Borg Warner SD-715) immersed in the test fluid. Tests were conducted at various temperatures employing a 5 kilogram load. The composition of the fluids tested are shown in the following tabulation. Various additives known to the art to perform particular functions including the succinimide dispersant have been incorporated into the base fluid to make it suitable for running transmission tests and to demonstrate compatibility with the friction modifiers of the invention.

Additive A:
   1-Hydroxyethyl-2-heptadecyl-2-imidazoline
Additive B:
   Bis-2-hydroxyethyl tertiary $C_{12-18}$ aliphatic amine
Additive C:
   Polyisobutenyl succinimide of tetraethylene pentamine
Base Fluid I:
   Additive C—6.00% w.
   Zinc dialkyldithiophosphate—0.50% w.
   Methylmethacrylate-isodecylacrylate copolymer—4.25% w.
   Silicone polymer—30 p.p.m.
   Fluorosilicon polymer—30 p.p.m.
   Dye—0.022% w.
   Mineral lubricating oil—Balance.
Composition 1:
   Base Fluid I plus 0.5% w. Additive A
Composition 2:
   Base Fluid I plus 0.5% w. Additive B
Composition 3:
   Base Fluid I plus 0.5% each Additives A and B
Composition 4:
   Base Fluid I plus 0.80 Additive A and 0.20% Additive B Modified four-ball wear tests were conducted on General Motors' specification transmission fluid, Base Fluid I and Composition 4 to determine the frictional characteristics of these fluids as measured by the relationship of the coefficient of friction to sliding speed at two different temperatures, i.e. 100° F. and 250° F. The results of these tests are shown in the drawing which is a graphic representation of the coefficient of friction versus the sliding speed for each of the samples tested. The curves shown are actual traces obtained from the four-ball apparatus. The oscillations about the trace between 1 and 10 f.p.m. are induced by slight eccentricities which excite the vibrational characteristics of the apparatus and should be ignored.

The shape of the curves obtained on the specification fluid, curves 1 and 2, indicate that preferred fluids have increasing coefficients of friction with increasing sliding speeds and that the coefficients of friction at 100° F. should be greater than the coefficient of friction at 250° F. It can be seen that curves 3 and 4 which were obtained on Base Fluid I without the friction modifying combination of the invention do not have the desired characteristics. Curve 3 which represents the test run at 100° F.

lies below curve 4 which represents the run made at 250° F. It is also apparent that the coefficient of friction is greater under static conditions than under kinetic conditions, indicating the Base Fluid I which contains many of the additives commonly used in transmission fluids, has the exact opposite fluid friction characteristics from those of the specification fluid. Curves 5 and 6, however, which represent the test runs conducted at 100° F. and 250° F., respectively, on Composition 4 which contains the friction modifiers of the invention, unexpectedly reversed the coefficient of friction to sliding speed relationship of the base fluid, and also the coefficient of friction to temperature relationship. It can be seen that the composition prepared in accordance with the invention, possesses the desired frictional characteristics and closely matches the curves of the specification fluid.

From the standpoint of fluid design, it has been found that either oxyalkylated amines or substituted imidazolines can change the relationship between coefficient of friction and the sliding speed of the base fluid. It has been further found, however, that substituted imidazolines are capable of lowering the static coefficient of friction at a greater rate than the kinetic friction. The oxyalkylated amines conversely lower the kinetic friction at a greater rate than the static friction. Thus through the interaction of these two modifiers, not only is it possible to change the shape of the friction curve, but it is also possible to attain the most desirable levels of static and kinetic friction. The beneficial effect of using a combination of the additives in controlling the absolute levels of static and kinetic friction is shown in Table I. These determinations were also made on the modified Four-Ball tester under the conditions previously described except the temperature was maintained at 220° F.

TABLE I

| Composition No. | Coefficient of friction | |
|---|---|---|
| | Static | Kinetic at 35 f.p.m. |
| Base fluid I | 0.182 | 0.165 |
| Composition 1 | 0.074 | 0.132 |
| Composition 2 | 0.111 | 0.120 |
| Composition 3 a | 0.077 | 0.118 |
| Specification fluid | 0.075 | 0.115 | a Average of three runs.

The results shown in Table I indicate that Composition 3 containing a combination of friction modifiers, has overall fluid friction properties superior to those of Compositions 1 and 2 containing the individual friction modifiers, and very nearly approaches the frictional characteristics of the specification fluid.

EXAMPLE II

In addition to having the desired fluid frictional characteristics, automatic transmission fluids must also be oxidation resistant, and have good viscosometric and lubricity properties.

A test designed to evaluate the combination of these properties is General Motors' Low-Energy, Transmission Cycling Friction-Retention and Oxidation Test, designated Test L in General Motors' Dexron GM 6032-M specification. The test equipment basically consists of a 327 CID Chevrolet V-8 (4 barrel carburetor) with a Powerglide Transmission coupled to a dynamometer. The test procedure involves part throttle upshift cycles at the rate of one cycle each 40 seconds for 150 hours plus or minus 5 test hours, shut down for 24 hours, then restart and continuation of upshift cycles until a total of 225 hours are accumulated. The actual upshift time must fall within the envelope illustrated in the test procedure, i.e., a range of 0.375 to 0.8 seconds. In addition, samples of the test fluid are taken at fixed intervals (approximately every 50 hours) and tested for viscosity, total acid number, total base number, pentane and benzene insolubles and insoluble resins. Color photographs are taken of the sump pan, suction screen and transmission underside and compared to standards. The specification also requires inspection of transmission parts for signs of abnormal wear. Therefore, this test procedure provides a relatively comprehensive evaluation of the essential properties of high performance transmission fluids.

To further demonstrate the unusual effectiveness of the compositions of the invention, Low Energy, Transmission Cycling tests were conducted on Composition 5, shown below, and on a commercial automatic transmission fluid. The results of these tests are shown in Table II. The extended Transmission Cycling test is a continuation of the previously described test beyond the 225 hour requirement. The test is continued until the transmission fails to shift within the specified 0.8 of a second.

Component: Composition 5, percent V.
   Additive A _____ 0.47
   Additive B _____ 0.38
   Additive C _____ 5.59
   Zinc dialkyldithiophosphate (Oronite 367) __ 0.39
   Methylmethacrylate-isodecylacrylate copolymer 4.14
   Silicone polymer, p.p.m. _____ 30
   Fluorsilicone polymer, p.p.m. _____ 30
   Dye _____ 0.022
   Base oil, balance.

TABLE II

| | Commercial fluid X | Composition 5 |
|---|---|---|
| Low-energy, transmission cycling friction-retention and oxidation test | Pass | Pass |
| Extended low-energy, transmission cycling friction-retention and oxidation test, hrs. to 0.8 second clutch lock-up | 241 | 540 |

The data presented in Table II indicate that while Commercial Fluid X (exact composition unknown) performed rather well exceeding the 225 hour specification requirement, Composition 5 containing the additive combination of the invention more than doubled this performance and operated within specification limits for 540 hours.

I claim as my invention:

1. A transmission fluid composition consisting essentially of a major amount of a lubricating oil and (1) from 0.01 to 4% by weight of a combination of (a) a 1-hydroxyalkyl-2-alkyl imidazoline, wherein the hydroxyalkyl group has from 2 to 6 carbon atoms and the alkyl group has from 8 to 20 carbon atoms, and (b) an oxyalkylated aliphatic tertiary amine wherein the aliphatic group of the tertiary amine has from 8 to 22 carbon atoms and the tertiary amine has been oxyalkylated with up to 5 mols of $C_2$ to $C_4$ alkylene oxide, the ratio of (a) to (b) being from 5:1 to 1:5; and (2) from 1 to 15% of an oil soluble polyalkenyl-substituted succinimide of an alkylene polyamine.

2. The compositions of claim 1 wherein the succinimide is a polyisobutenyl-substituted succinimide of an ethylene polyamine said polyisobutenyl group having a molecular weight of 500 to 5000.

3. The composition of claim 2 wherein the lubricating oil is a mineral lubricating oil, the combination of (a) and (b) is present in the amount from 0.05 to 2% by weight and the succinimide is present in the amount from 2 to 10% by weight.

4. The composition of claim 3 wherein the succinimide is a succinimide of tetraethylene pentamine.

5. The composition of claim 4 wherein the oxyalkylated amine is a bis-2-hydroxyethyl aliphatic amine, said aliphatic group having from 12 to 18 carbon atoms.

6. The composition of claim 4 wherein the imidazoline is 1-hydroxyethyl-2-heptadecyl-2-imidazoline.

7. The composition of claim 2 wherein the oxalylated amine is a bis-2-hydroxyethyl $C_{12-18}$ aliphatic amine, the imidazoline is 1-hydroxyethyl-2-heptadecyl - 2 - imidazoline and the ratio of the imidazoline to the oxyalkylated amine is 2:1 to 1:4.

8. The composition of claim 1 containing an oxidation inhibiting amount of a zinc dithiophosphate compound.

References Cited

UNITED STATES PATENTS

| | | | |
|---|---|---|---|
| 2,693,468 | 11/1964 | Blair | 260—309.6 X |
| 3,062,743 | 11/1962 | Manteuffel et al. | 252—51.5 R X |
| 3,088,910 | 5/1963 | Rudel et al. | 252—32.5 |
| 3,238,130 | 3/1966 | Matson | 252—51.5 R X |
| 3,251,853 | 5/1966 | Hoke | 260—309.6 |
| 3,324,032 | 6/1967 | O'Halloran | 252—77 X |
| 3,408,361 | 10/1968 | Mannheimer | 260—309.6 |

RICHARD D. LOVERING, Primary Examiner

U.S. Cl. X.R.

252—51.5 R, 77